(12) United States Patent
Schneider et al.

(10) Patent No.: US 6,568,709 B2
(45) Date of Patent: May 27, 2003

(54) BREAKAWAY WEB STOP FOR SEAT BELTS

(75) Inventors: David W. Schneider, Waterford, MI (US); Pontus Soderstrom, Rochester Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 46 days.

(21) Appl. No.: 09/872,106

(22) Filed: Jun. 1, 2001

(65) Prior Publication Data

US 2002/0180199 A1 Dec. 5, 2002

(51) Int. Cl.⁷ .......................... B60R 22/12; A62B 35/00
(52) U.S. Cl. ...................... 280/801.1; 280/808; 24/602; 24/704.1; 411/5
(58) Field of Search ................... 24/602, 115 F, 24/704.1, 704.2; 411/3, 4, 5; 280/801.1, 805, 808; 297/468, 470, 471, 472, 483

(56) References Cited

U.S. PATENT DOCUMENTS

| | | | | |
|---|---|---|---|---|
| 4,681,345 A | * | 7/1987 | Swartout | 280/801.1 |
| 4,720,204 A | * | 1/1988 | Johnson | 403/24 |
| 4,782,564 A | * | 11/1988 | Sloan | 24/704.1 |
| 4,818,824 A | * | 4/1989 | Dixit et al. | 174/92 |
| 5,023,980 A | | 6/1991 | Thomas | |
| 5,463,799 A | * | 11/1995 | Graham | 24/704.1 |
| 5,833,263 A | * | 11/1998 | Wittmann et al. | 280/728.3 |
| 6,056,471 A | * | 5/2000 | Dinitz | 403/2 |
| 6,419,264 B1 | * | 7/2002 | Tsuji et al. | 280/733 |

FOREIGN PATENT DOCUMENTS

FR     2 479 005     * 10/1981

* cited by examiner

Primary Examiner—Paul N. Dickson
Assistant Examiner—Ruth Ilan
(74) Attorney, Agent, or Firm—Sally J. Brown; James D. Erickson

(57) ABSTRACT

Breakaway web stops are provided which are employed in seat belt systems for restraining an occupant. In one such seat belt system, the seat belt webbing passes diagonally across the torso of the occupant, through a latch plate, and then across the lap of the occupant. To ensure that the latch plate stays in the correct position, web stops are placed on the seat belt webbing both above and below the correct position of the latch plate, allowing the latch plate to freely move between the two web stops, but not permitting it to move outside this range. In an accident, the breakaway web stop below the latch plate is configured to separate from the seat belt webbing, permitting the tension from the torso portion of the seat belt webbing to transfer to the lap portion of the seat belt webbing, providing additional and safety-enhancing restraint to the occupant, and, in particular, to the occupant's legs and lower body.

16 Claims, 3 Drawing Sheets

BREAKAWAY WEB STOP FOR SEAT BELTS

BACKGROUND OF THE INVENTION

1. Field of the Invention

The present invention relates to a seat belt system for restraining an occupant in a seat. More specifically, this invention limits the movement of the seat belt webbing relative to the latch plate during normal usage, but permits the seat belt webbing to slide through the latch plate during a collision, thus providing improved restraint to the occupant.

2. Relevant Technology

Seat belts are known to increase the safety of occupants in various motorized vehicles. Seat belt use is often cited as the most useful line of defense in reducing accident related injuries. The actions of consumer groups, governmental agencies, and political activists all reflect the tremendous societal value of seat belt use. Legislation requiring manufacturers to include seat belts in their vehicles has been in place for many years. More recently, laws have been enacted requiring consumers to use seat belts.

The benefits of seat belt use are numerous. In a collision, seat belts may prevent the occupant of a vehicle from striking the interior of the vehicle or other objects within the vehicle, including other occupants. Seat belts aid in keeping the occupant inside the vehicle, where the chances of survival are much greater. Seat belts may also keep the driver behind the wheel and in control of the vehicle in a collision, averting additional damage or injuries. Seat belts also enhance the effectiveness of other safety devices. For example, in a vehicle with airbags, a seat belt keeps the occupant in the seat, so the airbag can better protect the occupant.

Statistics show that lap/shoulder belts, when used properly, reduce the risk of fatal injury in front-seat-car occupants by 45 percent and the risk of moderate-to-critical injury by 50 percent. With respect to light truck occupants, seat belts reduce the risk of fatal injury by 60 percent and moderate-to-critical injury by 65 percent.

Seat belts vary in their configuration, but one of the most common types of seat belts is the lap belt. The lap belt includes right and left belts, which traverse an occupant's lap and are secured to each other near the occupant's mid-abdomen. The right and left belts may be secured together by a buckle. Lap belts are found in many different types of vehicles throughout the world.

Although conventional lap belts are well used and accepted, they do not limit movement of an occupant's head and torso. Thus, although the lower body is restrained, the upper body may experience rapid and dangerous movement during an accident. This is particularly dangerous for passengers in the front seat of an automobile, who may strike the steering wheel, dashboard, or windshield during an accident.

A seat belt having a shoulder strap limits an occupant's upper body movement in an accident, providing improved and potentially lifesaving restraint. Shoulder-strap restraints come in various configurations, involving both single- and double-strap implementations. In one commonly employed shoulder-strap configuration, the seat belt webbing traverses the occupant's upper body in a diagonal fashion, passes through a latch plate, and then traverses the occupant's lap. The latch plate is fastened to a buckle, which is secured to the vehicle, providing restraint to both the occupant's lower and upper body. This seat belt system is frequently employed in passenger vehicles.

However, in this configuration, problems arise in loading and unloading occupants. Often the latch plate becomes dislocated from its correct position, making it difficult for the occupant to locate the latch plate or correctly position the latch plate before engaging the seat belt.

The dislocation of the latch plate creates a number of safety and convenience issues. For example, the latch plate could move so far from its correct position that it may be difficult for the occupant to locate or secure the latch plate, discouraging the occupant from even using the seat belt. Also, in this condition, the seat belt webbing is more likely to become knotted or entangled with other items around the seat belt. Further, if the latch plate is not in the correct position when in use, the seat belt webbing may have slack, preventing the seat belt from safely restraining the occupant in the event of an accident.

To remedy these problems, web stops, also known as web stop buttons, were developed. A web stop is comprised of two end pieces connected by a crosspiece. The crosspiece passes through the seat belt webbing, an end piece being connected to each end of the crosspiece such that the end pieces are located on opposite sides of the seat belt webbing. The end pieces are large enough that the latch plate cannot pass over the web stop. Thus, the latch plate can move freely until contacting a web stop.

The end pieces are often shaped like disks or buttons, one of the two broadest edges of each of the disks or buttons being connected to the crosspiece. Often, the edges of the end pieces facing away from the crosspiece are rounded so that the web stops have the appearance of a small mound, with a flattened top, sitting on the seat belt webbing.

To keep the latch plate in the proper range, a web stop is often placed on the seat belt webbing, both above and beneath the latch plate. This restriction on the movement of the latch plate maintains the latch plate in the proper position before, during, and after use by an occupant.

While this restriction is desirable in normal usage, it has substantial limitations in the event of an accident. In a collision, the torso of the occupant is often thrust forward, applying great pressure to the torso portion of the seat belt webbing (the portion of the seat belt webbing above the latch plate). The torso portion of the seat belt webbing pulls on the lap portion of the seat belt webbing (the portion of the seat belt webbing below the latch plate) for only a fraction of a second. Then, the web stop below the latch plate makes contact with the latch plate. As conventional web stops are not designed to break away from the seat belt webbing in an accident, no more tension is transferred from the torso portion of the seat belt webbing to the lap portion of the webbing, leaving the lap portion of the seat belt undesirably loose and permitting the occupant's legs and lower body to be thrown in a dangerous fashion.

In this condition, the occupant's lower body may strike portions of the vehicle or other objects with great force. Most dangerously, lacking tension in the lap portion of the seat belt webbing, the occupant may slide completely or partially out of the seat belt restraint (this process is known as "submarining"), resulting in potentially more serious injuries. The transfer of tension from the torso portion of the seat belt to the lap portion of the seat belt during an accident is desirable and enhances the restraining capabilities of the seat belt.

Thus, it would be an advancement in the art to provide a web stop that remains in place during normal usage, but separates from the seat belt webbing during a collision.

Such an apparatus is disclosed and claimed herein.

SUMMARY OF THE INVENTION

The apparatus of the present invention has been developed in response to the present state-of-the-art, and, in particular, in response to problems and needs in the art that have not yet been fully resolved by currently available seat belt systems. Thus, it is an overall objective of the present invention to provide a breakaway web stop apparatus for enhancing the effectiveness of seat belt restraint systems.

To achieve the foregoing objects, and in accordance with the invention as embodied and broadly described in the preferred embodiment, a breakaway web stop enabling a seat belt system to provide increased restraint is provided. In one such seat belt system, the seat belt webbing may traverse an occupant's upper body in a diagonal fashion, passing through a webbing orifice in a latch plate, and then crossing over the occupant's lap. When the seat belt system is in use, the latch plate is secured to a buckle within the vehicle. Frequently, each end of the seat belt webbing is attached to a retractor. In another embodiment, one end of the seat belt webbing is attached to a retractor, and the other end is anchored to the vehicle.

In one embodiment, a conventional web stop or breakaway web stop may be attached to the seat belt webbing slightly above the latch plate, forming an upper boundary for the proper range of the latch plate. A breakaway web stop is attached to the seat belt webbing slightly below the latch plate, forming a lower boundary for the proper range of the latch plate.

As with a conventional web stop, the breakaway web stop contains two end pieces and a crosspiece situated between and connected to two end pieces. The crosspiece of the breakaway web stop also passes through the seat belt webbing, having an end piece on each end of the crosspiece, the end pieces being located on opposite sides of the seat belt webbing. The crosspiece of the breakaway web stop may take on a wide variety of shapes, being, for example, cylindrical or rectangular. A breakaway web stop differs from the conventional web stop in shape and configuration for the purpose of permitting the breakaway web stop to separate from the seat belt webbing upon the application of a specific amount of force.

In one embodiment of the breakaway web stop, there is a notch on the crosspiece. The notch creates a "weak point" within the web stop such that the crosspiece will break at the narrowest point of the crosspiece when the web stop is subjected to the force of an accident. More specifically, in the event of an accident, the torso of the occupant is thrust forward, creating tension in the torso portion of the seat belt. The breakaway web stop located below the latch plate is pulled against the latch plate, and the breakaway web stop separates from the seat belt webbing. This separation allows tension from the torso portion of the seat belt webbing to be transferred to the lap portion of the seat belt webbing, providing superior restraint to the occupant.

By varying the position and characteristics of the notch, the web stop manufacturer can determine the amount of force required to break the web stop. The notch in the crosspiece may be positioned at the midpoint of the crosspiece relative to the two end pieces and may face the latch plate. However, the notch may be positioned elsewhere to vary the force required to break the web stop and the manner in which the web stop separates from the seat belt webbing.

In another embodiment of the breakaway web stop, the crosspiece of the web stop has a narrow portion. The narrow portion is smaller than at least one adjacent portion of the crosspiece. The narrowest point of the crosspiece presents the most likely point of breakage in an accident. In this embodiment, the crosspiece may take on a number of different forms. For example, the crosspiece may gradually or abruptly decrease in size, forming a narrow portion. Again, by altering the characteristics of the crosspiece, the manufacturer can specify the amount of force required to break the web stop. Many combinations satisfy the parameters of this embodiment, as envisioned by the inventors.

Other embodiments alter the configuration of the end pieces, rather than the crosspiece. In one such embodiment, each end piece has angled edges, the angled edges being configured to push at least a portion of the end pieces together as the web stop is pulled into the webbing orifice as a result of an accident. In one embodiment, each end piece also has a leading end, a trailing end, and an interior edge. The interior edge is the edge of the end piece attached to the crosspiece. The leading end is the end of the end piece situated closest to the latch plate when the seat belt system is in use, while the trailing end is the end of the end piece situated farthest from the latch plate. The angled edges converge toward the opposing end piece and the leading end, forming a wedge. When the force of an accident pulls the wedge-shaped web stop against the latch plate, the end pieces, being situated on opposite sides of the seat belt webbing, are pulled into the webbing orifice. As this web stop is pulled further into the webbing orifice and because of the increasing width of the end pieces, at least a portion of the end pieces are toward each other, applying force to the crosspiece. Finally when the pressure is great enough, the crosspiece breaks, freeing the web stop from the seat belt webbing. This breakage may occur by forcing the end pieces to rotate or by simply pushing the end pieces together. To effectuate this operation, each of the leading ends must be sufficiently narrow to simultaneously fit within the webbing orifice, on opposite sides of the seat belt webbing.

Thus, the breakaway web stop, in its various embodiments, maintains the seat belt webbing in the correct position relative to the latch plate during normal usage, but breaks away from the latch plate in an accident, providing increased safety and convenience to its users.

These and other features, and advantages of the present invention will become more fully apparent from the following description and appended claims, or maybe learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof, which are illustrated in the appended drawings. With the understanding that these drawings only provide selected embodiments of the invention and are not therefore to be considered limiting of the scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus and system of the present invention, as represented in FIGS. 1 through 5, is not intended to limit the scope of the invention, as claimed, but is merely representative of presently preferred embodiments of the invention.

As a result of this invention, the web stop maintains the correct relationship between the seat belt webbing and the latch plate during normal usage, but separates from the seat belt webbing in an accident. More specifically, the web stop is designed to breakaway from the seat belt webbing when it is pulled against the latch plate in an accident, enabling the tension from the torso portion of the seat belt webbing to freely transfer to the lap portion of the seat belt webbing.

In this application, the term vehicle refers to a broad array of motorized and non-motorized modes of transportation. Vehicle may refer to, for example, trucks, automobiles, forklifts, and graders. The term vehicle may further refer to any mode of transportation in which a seat belt apparatus may provide additional protection and safety to an occupant thereof.

In this context, the term accident is broad and refers to any collision or impact involving a vehicle and any abnormal and potentially dangerous acceleration or deceleration of the vehicle. For example, accidents may involve collisions between a vehicle and another vehicle, or between a vehicle and any other stationary or moving object. Accidents may also entail rollovers, when the driver is compelled to "slam on" the brakes to avoid a dangerous situation, or other similar events in which the occupants of the vehicle may be endangered.

Figure 1:
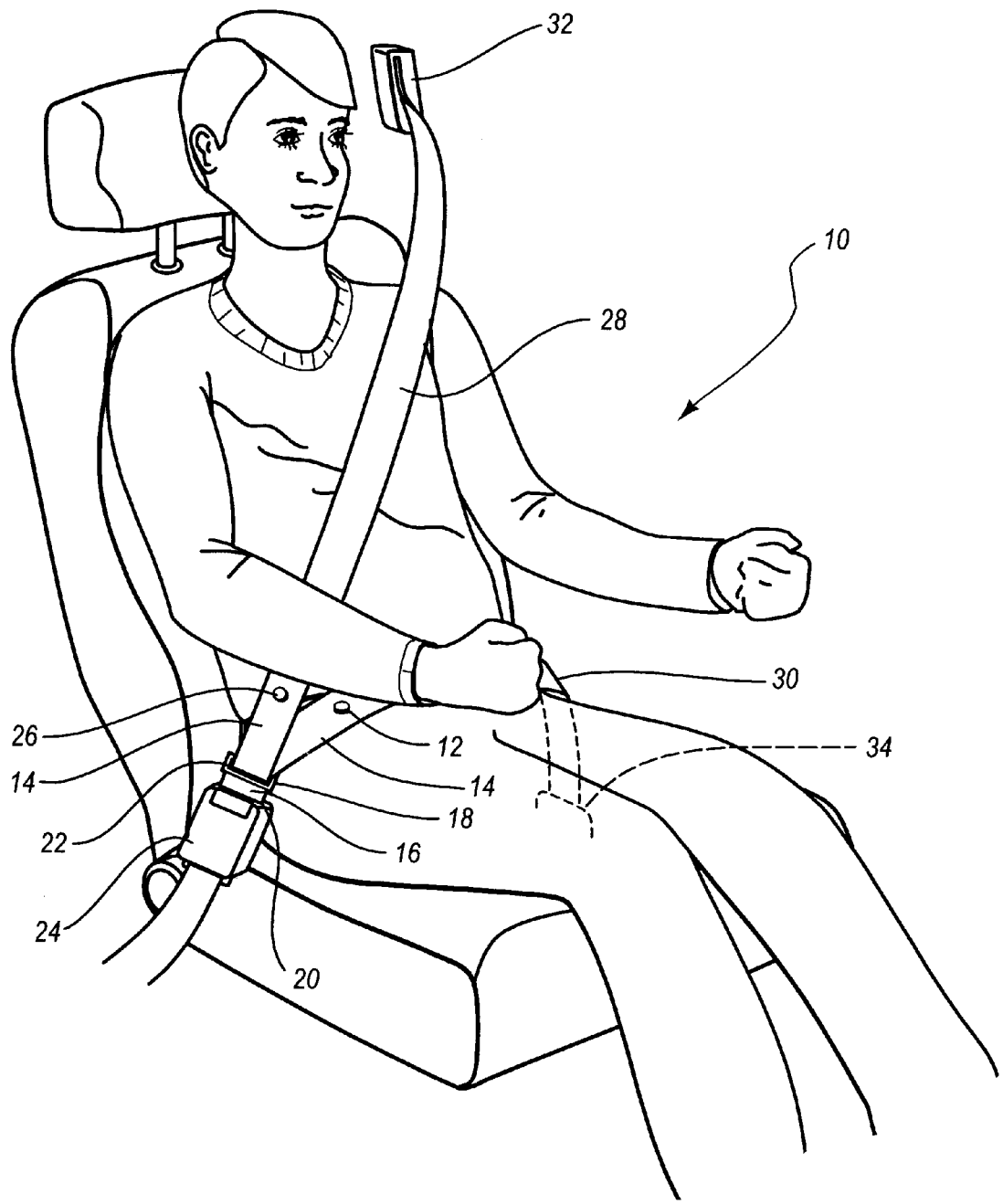
FIG. 1 is a perspective view of a seat belt system employing the breakaway web stop of the present invention.

FIG. 1 is a perspective view of the dual-retractor seat belt system 10 employing the breakaway web stop 12. This system employs seat belt webbing 14, which traverses the torso of the occupant, passes through the latch plate 16, and passes across the occupant's lap. A conventional web stop 26, which is not designed to breakaway from the seat belt webbing 14, is positioned above the latch plate 16 (or, in other words, on the torso portion 28 of the seat belt webbing). A breakaway web stop 12 is positioned below the latch plate (or, in other words, on the lap portion 30 of the seat belt webbing) and will separate from the seat belt webbing in an accident. The manufacturer of such a device may specify the force required to separate the breakaway web stop 12 from the seat belt webbing 14 by altering the characteristics of the breakaway web stop 12.

Figure 2:
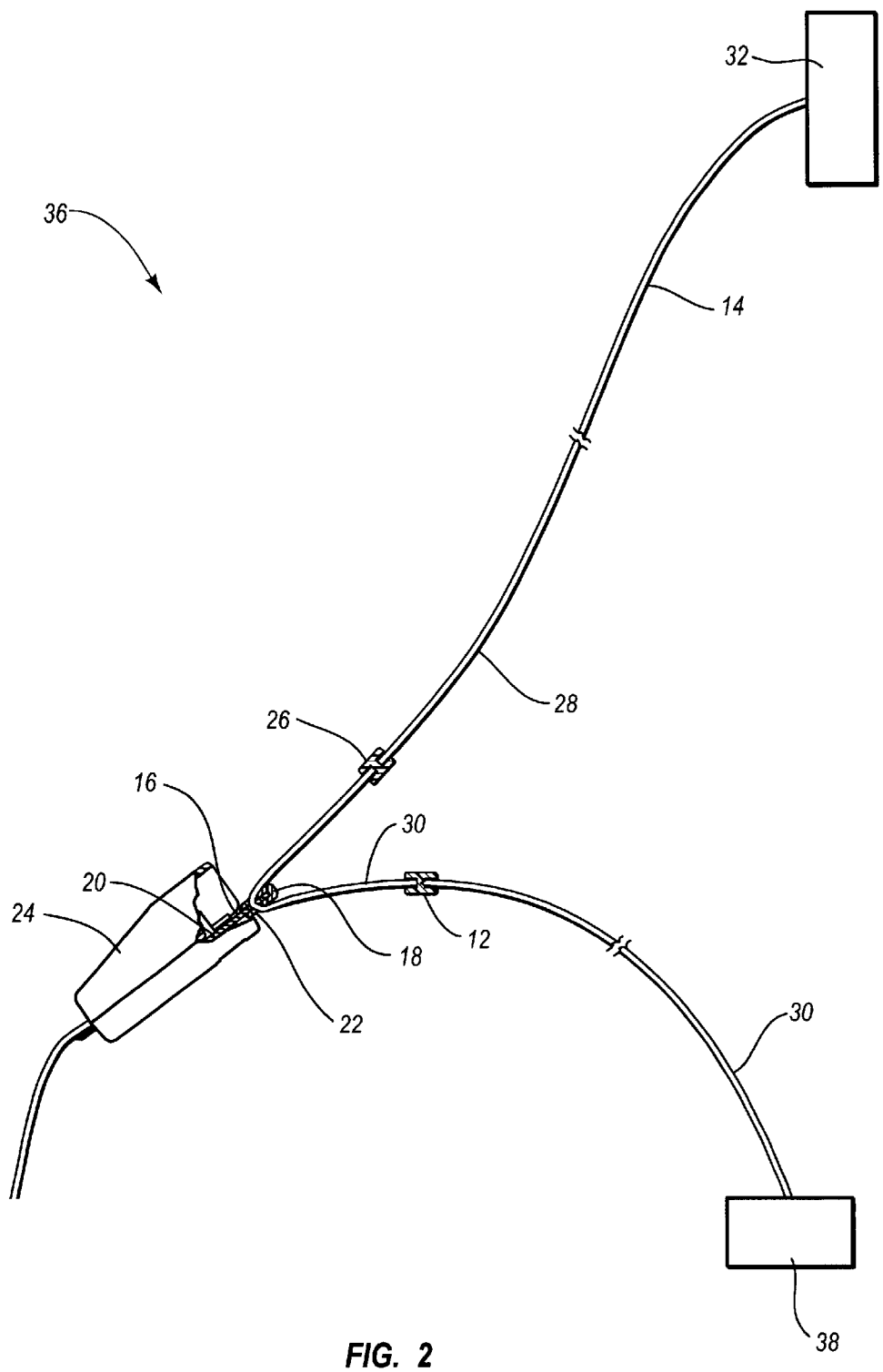
FIG. 2 is a cross-sectional view of a seat belt system employing the breakaway web stop.

The latch plate 16 comprises a body 18 and a buckle interface 20. The body 18 and the buckle interface 20 may be a unitary piece or may, in a separate embodiment, comprise separate pieces connected together. In one embodiment, the buckle interface 20 and body 18 are a unitary piece, but only the body 18 is encased in plastic. Such an embodiment is shown in FIG. 2, and, as a consequence, the body 18 is wider than the buckle interface 20. The buckle interface 20 fastens to the buckle 24 providing a secure connection during use of the seat belt. The body 18 has a webbing orifice 22, the webbing orifice 22 being configured so that the seat belt webbing 14 may pass through it. The latch plate 16 and the buckle 24 are known in the industry and well understood by those skilled in the art.

Often, when a vehicle is involved in a collision, the torso of the occupant is thrust forward, applying great force to the seat belt webbing 14. When using this invention in an accident, the breakaway web stop 12 separates from the seat belt webbing 14, transferring the tension from the torso portion of the seat belt webbing 28 to the lap portion of the seat belt webbing 30. This tension provides additional restraint to the occupant's lap, legs, and lower body, increasing the effectiveness of the seat belt system.

The seat belt webbing 14 is connected at one end to a torso retractor 32 and, at the other end, to a lap retractor 34. The torso retractor 32 and the lap retractor 34 are commonly known in the industry and are understood by those skilled in the art. Typically, the torso retractor 32 and the lap retractor 34 are configured with a sensor in order to secure the seat belt webbing 14 in the event of an accident.

Pretensioners, which tighten the seat belt in the very first fractions of a second in an accident, may also be used in conjunction with the retractors. Pretensioners are also well known in the industry and are understood by those skilled in the art.

FIG. 2 is a cross-sectional view of a single-retractor seat belt system 36 employing the breakaway web stop 12. In this embodiment, one end of the seat belt webbing 14 may be connected to the vehicle by an anchoring device 38, while the other end of the seat belt webbing 14 is connected to the vehicle by either a torso retractor 32 or a lap retractor 34. In FIG. 2, one end of the seat belt webbing 14 is attached to a torso retractor 32, and the other end of the seat belt webbing 14 is attached to an anchoring device 38.

The anchoring device 38 may include, for example, a bolt, screw, or other functionally similar device connecting the seat belt webbing 14 to the vehicle. Often, the bolt or screw may be covered by a casing to prevent tampering. Those skilled in the art are familiar with methods of anchoring the seat belt webbing 14 to the vehicle.

As with FIG. 1, FIG. 2 displays the seat belt webbing 14 passing through the webbing orifice 22 of the latch plate 16. Again, the body 18 of the latch plate 16 is wider than the buckle interface 20 because, for example, the body 18 may be encased in plastic.

The conventional web stop 26 is shown attached to the torso portion 28 of the seat belt webbing 14. The breakaway web stop 12 is shown attached to the lap portion 30 of the seat belt webbing 14. Again, in the event of an accident, the breakaway web stop 12 will separate from the seat belt webbing 14, allowing the tension from the torso portion 28 of the seat belt webbing to transfer to the lap portion 30 of the seat belt webbing, resulting in superior restraint to the occupant.

Figure 3:
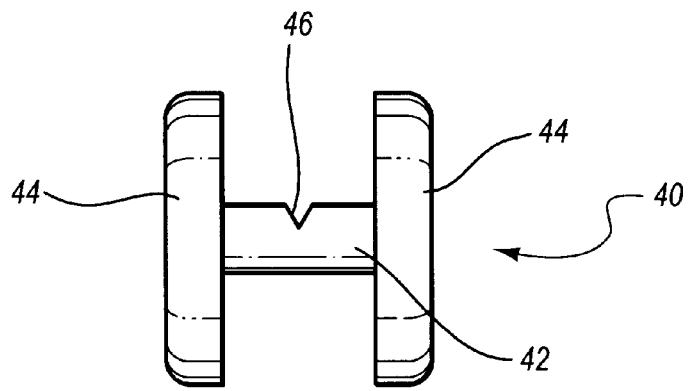
FIG. 3 is a plan view of one of the embodiments of the breakaway web stop having a notch in its crosspiece.

FIG. 3 is a plan view of the notched web stop 40, one embodiment of the breakaway web stop 18. This embodiment has a crosspiece 42 situated between and connected to two end pieces 44. The term "connected to" refers to any suitable means of connection. For example, in one embodiment, "connected to" may mean that the crosspiece 42 and one end piece 44 form a unitary part and the "unattached" end of the crosspiece 42 may be connected to an end piece through the use of glue, an adhesive, or by soldering. Also, the crosspiece 42 may be configured to "snap into" an opening in an end piece 44. Thus, the term "connected to" is broad and is meant to encompass all methods of connecting a crosspiece to the end pieces which are known to those skilled in the art.

In FIG. 3, the crosspiece 42 contains a notch 46. Here, the term notch 46 indicates a V-shaped portion, which has been removed from the crosspiece 42. The manufacturer may vary the position and characteristics of the notch 46 in order to specify the force required to separate the notched web stop 40 from the seat belt webbing 14. In one embodiment, the crosspiece 42 may contain multiple notches 46 of varying or identical sizes.

Again, in the event of an accident, greater force may be applied to the torso portion 28 than to the lap portion 30 of the seat belt webbing. In that case, the notched web stop 40 is pulled towards the latch plate 16. When the end pieces 44 make contact with the latch plate 16, the end pieces 44 are stopped, and force is applied to the crosspiece 42 by the pulling action of the seat belt webbing 14. When this force is applied to the crosspiece 42, the crosspiece 42 breaks (preferably at the notch 46), and the notched web stop 40 separates from the seat belt webbing 14, allowing the seat belt webbing 14 to freely pass through the latch plate 16 and creating increased tension in the lap portion 30 of the seat belt webbing 14. This increased tension provides greater restraint to the occupant's lower body and legs, enhancing the effectiveness of the seat belt system.

Figure 4:
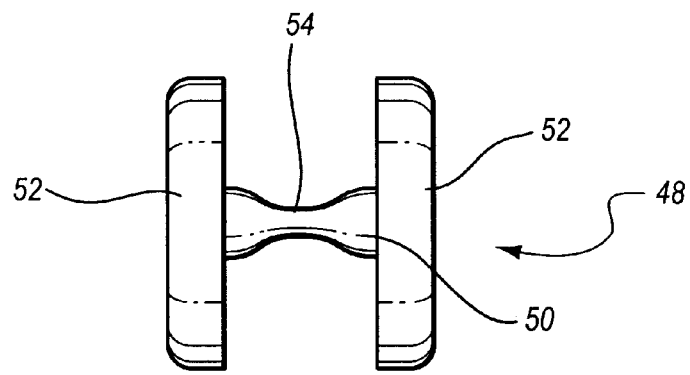
FIG. 4 is a plan view of another embodiment of the breakaway web stop having a narrow portion.

FIG. 4 is a plan view of the narrowed web stop 48, another embodiment of this invention. Again, this embodiment involves a crosspiece 50 situated between and connected to two end pieces 52. The narrow portion 54 is smaller than at least one adjacent portion of the crosspiece 50. The narrowest portion of the crosspiece presents the most likely point of breakage in an accident.

In this embodiment, the crosspiece 50 may take on a number of different forms. For example, the crosspiece 50 may gradually or abruptly decrease in size, forming a narrow portion 54. The narrow portion 54 may decrease in size in a linear or nonlinear fashion, or may be positioned adjacent to the end piece 52, or maybe positioned at a midpoint between the end pieces 52. The crosspiece 50 is not necessarily symmetrical. The crosspiece 50 may also contain more than one narrow portion 54, each narrow portion 54 being identical or varying in size or characteristics. Again, by altering the characteristics of the narrow portion or portions 54, the manufacturer can determine the amount of force required to break the web stop. Many combinations satisfy the parameters of this embodiment, as envisioned by the inventors.

The narrowed web stop 48 functions in a manner similar to the notched web stop 40. Again, in the event of an accident, greater force may be applied to the torso portion 28 than the lap portion 30 of the seat belt webbing 14, and the narrowed web stop 48 is pulled towards the latch plate 16. When the end pieces 52 make contact with the latch plate 16, the end pieces 52 are stopped, and force is applied to the crosspiece 50 by the pulling action of the seat belt webbing 14. When this force is applied to the crosspiece 50, the crosspiece 50 breaks (preferably at the narrowest portion of the crosspiece 50), and the narrowed web stop 48 separates from the seat belt webbing 14, again allowing the seat belt webbing 14 to freely pass through the latch plate 16 and creating increased tension in the lap portion 30 of the seat belt webbing. In this manner, additional restraint is provided to the occupant's legs and lower body.

Figure 5:
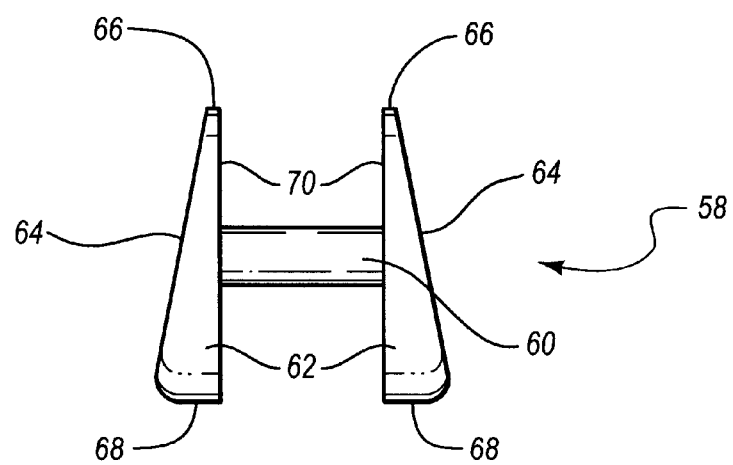
FIG. 5 is a plan view of yet another embodiment of the breakaway web stop, wherein the end pieces have angled edges.

FIG. 5 is a plan view of a wedge-shaped web stop 58, yet another embodiment of the breakaway web stop 12. As with the other embodiments, a crosspiece 60 is located between and connected to two end pieces 62. In the embodiment shown in FIG. 5, the shape of the end pieces 62 determines the force required to break the wedge-shaped web stop 58. Each end piece has angled edges 64, the angled edges 64 being configured to push at least a portion of the end pieces 62 together as the web stop 58 is pulled into the webbing orifice 22 as a result of an accident. Each end piece 62 also has a leading end 66, a trailing end 68, and an interior edge 70. The interior edge 70 is the edge of the end piece 62 attached to the crosspiece 60. The leading end 66 is the end of the end piece 62 situated closest to the latch plate 16, while the trailing end 68 is the end of the end piece 62 situated farthest from the latch plate 16. The angled edges 64 of each end piece 62 converge towards each other such that on each end piece 62 the angled edge 64 meets the interior edge 70 at the leading end 66. Thus, each end piece 62 is shaped like a wedge.

In the embodiment shown in FIG. 5, the crosspiece 60 is neither narrowed nor notched. While still employing the design of the crosspiece 60 shown in FIG. 5, the manufacturer may vary the force required to break the wedge-shaped web stop 58 by altering the width of the crosspiece 60.

In an accident, the torso of the occupant may be thrust forward, creating great tension on the torso portion 28 of the seat belt webbing 14 and pulling the wedge-shaped web stop 58 against the latch plate 16. The end pieces 62, being situated on opposite sides of the seat belt webbing 14, are pulled into the webbing orifice 22. As this web stop 58 is pulled further into the webbing orifice 22 and because of the increasing width of the end pieces 62, at least a portion of each end piece 62 is pushed toward the other end piece 62, applying force to the crosspiece 60. When the pressure is great enough, the crosspiece 60 breaks, freeing the web stop 58 from the seat belt webbing 14. To effectuate this operation, each of the leading ends 66 must be sufficiently narrow to simultaneously fit within the webbing orifice, on opposite sides of the seat belt webbing.

In this embodiment, the crosspiece 60 may be broken in a number of different ways. For example, as the end pieces 62 are forced into the webbing orifice 22, the leading ends 66 may be pushed together, while the trailing ends 68 may be forced apart (the crosspiece 60 acting as a fulcrum), rotating the end pieces 62 and breaking the crosspiece 60. This type of breakage will occur if the webbing orifice 22 applies force to the angled edge 64 between the leading end 66 and the crosspiece 60. If the webbing orifice 22 impacts the angled edge 64 following the crosspiece 60, the trailing ends 68 will be pushed together, while the leading ends 66 will be pushed apart, again rotating the end pieces 62 and breaking the crosspiece 60. If the webbing orifice 22 impacts the angled edge 64 where an imaginary extension of the crosspiece 60 intersects the angled edge 64, the end pieces 62 may simply be pushed together bending and breaking the crosspiece 60. In one implementation, the end pieces 62 and/or crosspiece 60 may simply be compressed or distorted to allow the wedge-shaped web stop 58 to pass through the webbing orifice 22.

The angled edges 64 may be configured in numerous ways and still satisfy the parameters of this invention. That is to say, the angled edges 64 of the wedge-shaped web stop 58 may be configured in numerous ways and still force at least a portion of the end pieces 62 together upon entering the webbing orifice 22. For example, the angled edges 64 may be more steeply inclined. As another example, the angled edges 64 may turn and run parallel to the interior edges 70 near the trailing end 68. In another embodiment, the angled edges 64 are not necessarily linear, but may be bowed either in a concave or a convex fashion, or may involve a number of distinct angled planes. The end piece may involve other angles and planes and still effectuate the same operation described above. In sum, the embodiment shown in FIG. 5, merely describes one structural embodiment of the end piece 62 that will push at least a portion of the end pieces 62 together when the end pieces 62 enter the webbing orifice 22.

Thus, the breakaway web stop of the present invention resolves problems not previously solved by those skilled in the art. The breakaway web stop keeps the latch plate in the correct position before, during, and after usage, but separates from the seat belt webbing in the event of an accident. This separation allows the tension in the torso portion of the seat belt webbing to transfer to the lap portion of the seat belt webbing. As a consequence, greater restraint is provided by the lap portion of the seat belt webbing, enhancing the effectiveness of the seat belt. The breakaway web stop may be employed with numerous existing seat belt systems, including with the inflatable seat belt.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by Letters Patent is:

1. A seat belt apparatus for use in a vehicle, the seat belt apparatus comprising:
   a latch plate having a webbing orifice;
   seat belt webbing being configured to pass through the webbing orifice;
   a breakaway web stop secured to the seat belt webbing, the breakaway web stop being configured to separate from the seat belt webbing when the breakaway web stop is pulled against the latch plate as a result of an accident involving the vehicle.

2. A seat belt apparatus as defined in claim 1, wherein the seat belt webbing comprises a lap portion, and wherein the breakaway web stop is attached to the lap portion of the seat belt webbing.

3. A seat belt apparatus as defined in claim 1, wherein the breakaway web stop comprises:
   two end pieces; and
   a crosspiece situated between and connected to the two end pieces.

4. A seat belt apparatus as defined in claim 3, wherein the crosspiece comprises at least one notch.

5. A seat belt apparatus as defined in claim 3, wherein the crosspiece comprises at least one narrow portion.

6. A seat belt apparatus as defined in claim 3, wherein the breakaway web stop is pulled into the webbing orifice as a result of the accident, and wherein each end piece comprises an angled edge configured such that at least a portion of each end piece is pushed towards the other end piece as the web stop is pulled into the webbing orifice.

7. A seat belt apparatus as defined in claim 6, wherein each end piece further comprises a leading end and an interior edge, the angled edges of each end piece converging towards each other such that on each end piece the angled edge meets the interior edge at the leading end, both of the leading ends being sufficiently narrow to simultaneously fit within the webbing orifice, on opposite sides of the seat belt webbing.

8. A vehicle seat belt restraint system, comprising:
   a vehicle;
   a latch plate having a webbing orifice;
   seat belt webbing being configured to pass through the webbing orifice and having two ends, each end of the seat belt webbing being connected to the vehicle; and
   a breakaway web stop secured to the seat belt webbing, the breakaway web stop being configured to separate from the seat belt webbing when the breakaway web stop is pulled against the latch plate as a result of an accident involving the vehicle.

9. A vehicle seat belt restraint system as defined in claim 8, wherein the seat belt webbing comprises two ends, one end being connected to the vehicle by a torso retractor and the other end being connected to the vehicle by a lap retractor.

10. A vehicle seat belt restraint system as defined in claim 8, wherein the seat belt webbing comprises two ends, one end being connected to the vehicle by a retractor and the other end being connected to the vehicle by an anchoring device.

11. A vehicle seat belt restraint system as defined in claim 8, wherein the seat belt webbing comprises a lap portion, and wherein the breakaway web stop is attached to the lap portion of the seat belt webbing.

12. A vehicle seat belt restraint system as defined in claim 8, wherein the breakaway web stop comprises:
    two end pieces; and
    a crosspiece situated between and connected to the two end pieces.

13. A vehicle seat belt restraint system as defined in claim 12, wherein the crosspiece comprises at least one notch.

14. A vehicle seat belt restraint system as defined in claim 12, wherein the crosspiece comprises at least one narrow portion.

15. A vehicle seat belt restraint system as defined in claim 12, wherein the web stop is pulled into the webbing orifice as a result of the accident, and wherein each end piece comprises an angled edge configured such that at least a portion of each end piece is pushed towards the other end piece as the web stop is pulled into the webbing orifice.

16. A vehicle seat belt restraint system as defined in claim 15, wherein each end piece further comprises a leading end and an interior edge, the angled edges of each end piece converging towards each other such that on each end piece the angled edge meets the interior edge at the leading end, both of the leading ends being sufficiently narrow to simultaneously fit within the webbing orifice, on opposite sides of the seat belt webbing.

* * * * *